O. EVANS.
Fret Saw Frame.

No. 162,810.

Patented May 4, 1875.

WITNESSES:

INVENTOR:
Owen Evans
BY
ATTORNEYS.

UNITED STATES PATENT OFFICE.

OWEN EVANS, OF HALIFAX, CANADA.

IMPROVEMENT IN FRET-SAW FRAMES.

Specification forming part of Letters Patent No. 162,810, dated May 4, 1875; application filed April 10, 1875.

*To all whom it may concern:*

Figure 1:
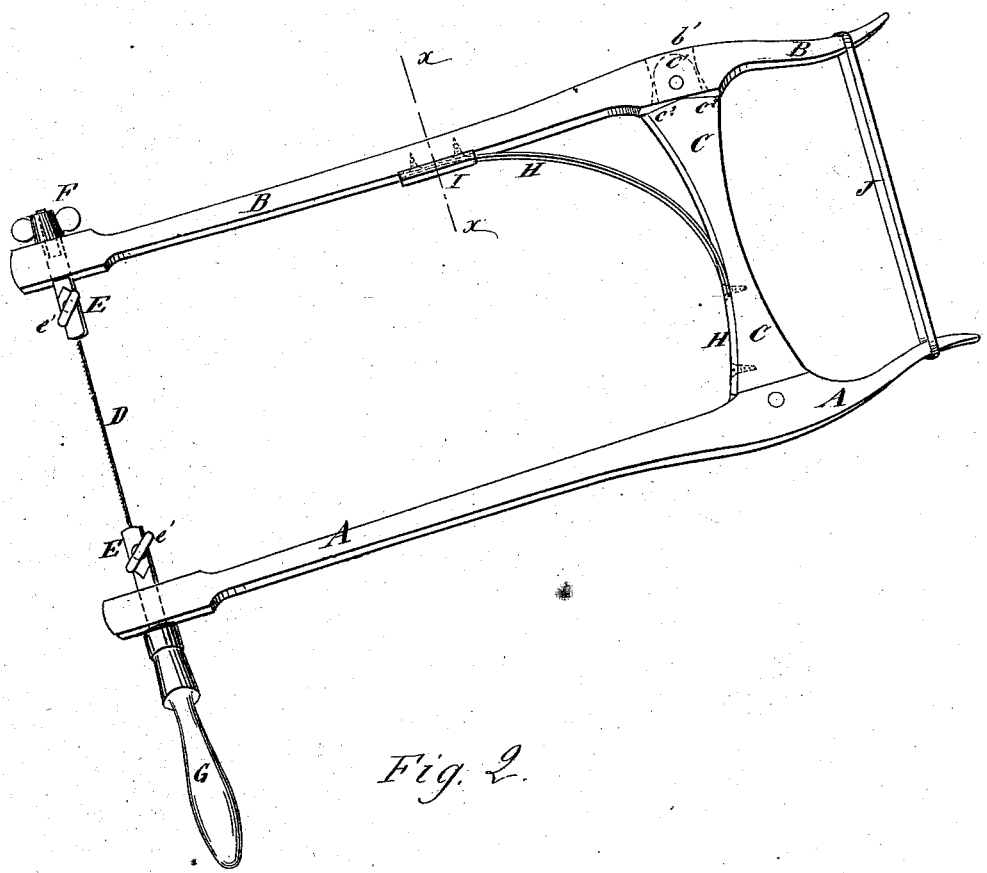
Figure 2:
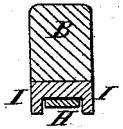

Be it known that I, OWEN EVANS, of Halifax, Halifax county, Province of Nova Scotia, Dominion of Canada, have invented a new and useful Improvement in Fret-Saw Frames, of which the following is a specification:

Figure 1 is a side view of my improved saw-frame, and Fig. 2 is a detail cross-section, taken through the line $x\ x$, Fig. 1.

Similar letters of reference indicate corresponding parts.

The object of this invention is to improve the construction of fret-saw frames, so as to give a steady tension to the saw without straining the frame, and so as to enable the saw to be easily connected and disconnected, as may be required.

The invention consists in the combination of the two springs and the flanged plates with the frame, having a pivoted mortise and tenon joint at one end of the cross-bar of said frame, as hereinafter fully described.

A and B are the arms or side bars of the frame, which are connected at a little distance from their rear ends by a cross-bar C. One end of the cross-bar C is rigidly connected with the arm A by a tenon and mortise. Upon the other end of the cross-bar C is formed a tenon, $c^1$, the shoulders $c^2$ of which are beveled off from the center toward each end, or are rounded, and the mortise $b'$ of the arm B is enlarged or made flaring, so that the said arm B may play upon the end of the cross-bar C. D is the saw, the ends of which are secured in the clamps E by the hand-screws $e'$. The shanks of the clamps E pass through the ends of the arms A B, have screw-threads cut upon them, upon one of which is screwed the hand-nut F, and upon the other is screwed the handle G. To the forward edge of the cross-bar C, near the rigid arm A, is secured the end of a curved spring, H, the free end of which rests against a plate, I, attached to the inner side of the pivoted arm B. Upon the side edges of the plate I are formed flanges to keep the end of the spring H in place. The rear ends of the arms A are connected by a rubber or spiral spring, J, placed upon or attached to them. The spring J acts in connection with the spring H to give the desired tension to the saw, and also serves to relieve the pivot of the joint $b'\ c^1\ c^2$ from the side strain that would otherwise come upon it.

Having thus described my invention, I claim as new and desire to secure by Letters Patent—

The combination of the springs H J and the flanged plate I with the frame A B C, having a pivoted mortise and tenon joint, $b'\ c^1\ c^2$, at one end of the cross-bar C, substantially as herein shown and described.

OWEN EVANS.

Witnesses:
G. M. EVANS,
J. C. HEALY.